United States Patent [19]

Bliss et al.

[11] Patent Number: 5,016,997

[45] Date of Patent: May 21, 1991

[54] PARTIALLY SEGMENTED DEFORMABLE MIRROR

[75] Inventors: Erlan S. Bliss, Danville; James R. Smith; J. Thaddeus Salmon, both of Livermore; Julio A. Monjes, San Ramon, all of Calif.

[73] Assignee: The United States of America as represented by the United States Department of Energy, Washington, D.C.

[21] Appl. No.: 523,504

[22] Filed: May 15, 1990

[51] Int. Cl.$^5$ ................................................ G02B 5/08
[52] U.S. Cl. .................................... 350/607; 350/610; 350/611; 372/99
[58] Field of Search .................. 372/99; 350/607, 610, 350/611

[56] References Cited

U.S. PATENT DOCUMENTS

| | | | |
|---|---|---|---|
| 3,904,274 | 9/1975 | Feinleib et al. | 350/607 |
| 4,657,358 | 4/1987 | Anthony et al. | 350/607 |
| 4,906,087 | 3/1990 | Ealy et al. | 350/607 |

Primary Examiner—James W. Davie
Attorney, Agent, or Firm—Miguel A. Valdes; Roger S. Gaither; William R. Moser

[57] ABSTRACT

A partially segmented deformable mirror is formed with a mirror plate having a smooth and continuous front surface and a plurality of actuators to its back surface. The back surface is divided into triangular areas which are mutually separated by grooves. The grooves are deep enough to make the plate deformable and the actuators for displacing the mirror plate in the direction normal to its surface are inserted in the grooves at the vertices of the triangular areas. Each actuator includes a transducer supported by a receptacle with outer shells having outer surfaces. The vertices have inner walls which are approximately perpendicular to the mirror surface and make planar contacts with the outer surfaces of the outer shells. The adhesive which is used on these contact surfaces tends to contract when it dries but the outer shells can bend and serve to minimize the tendency of the mirror to warp.

9 Claims, 3 Drawing Sheets

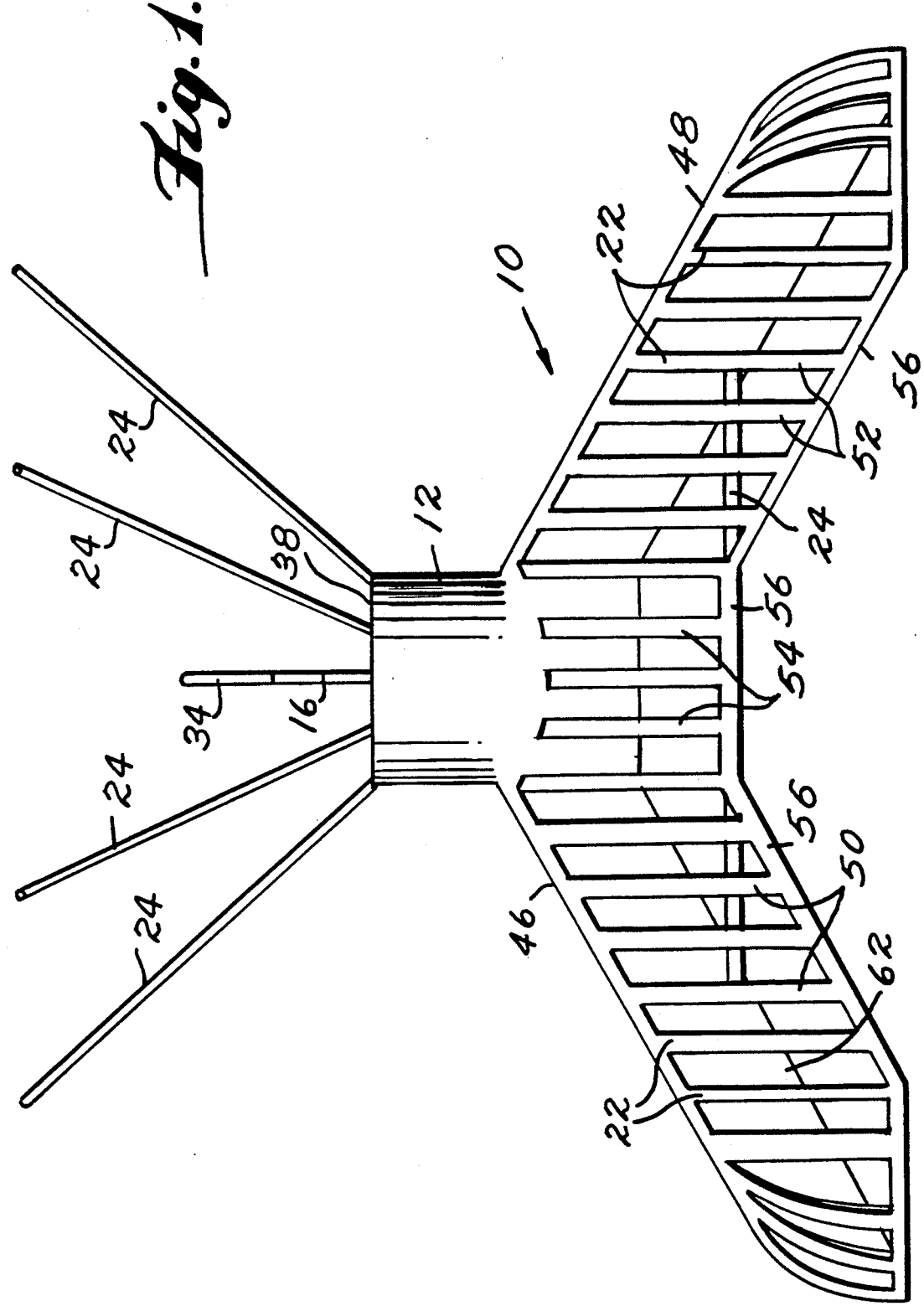

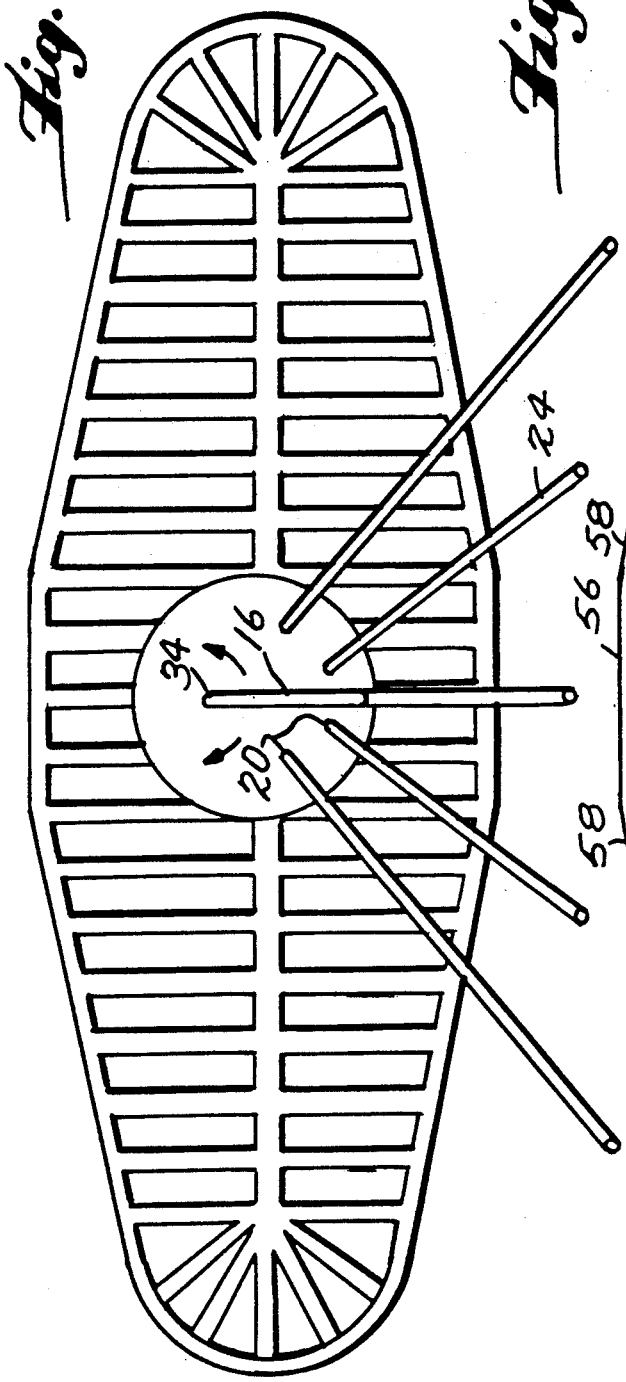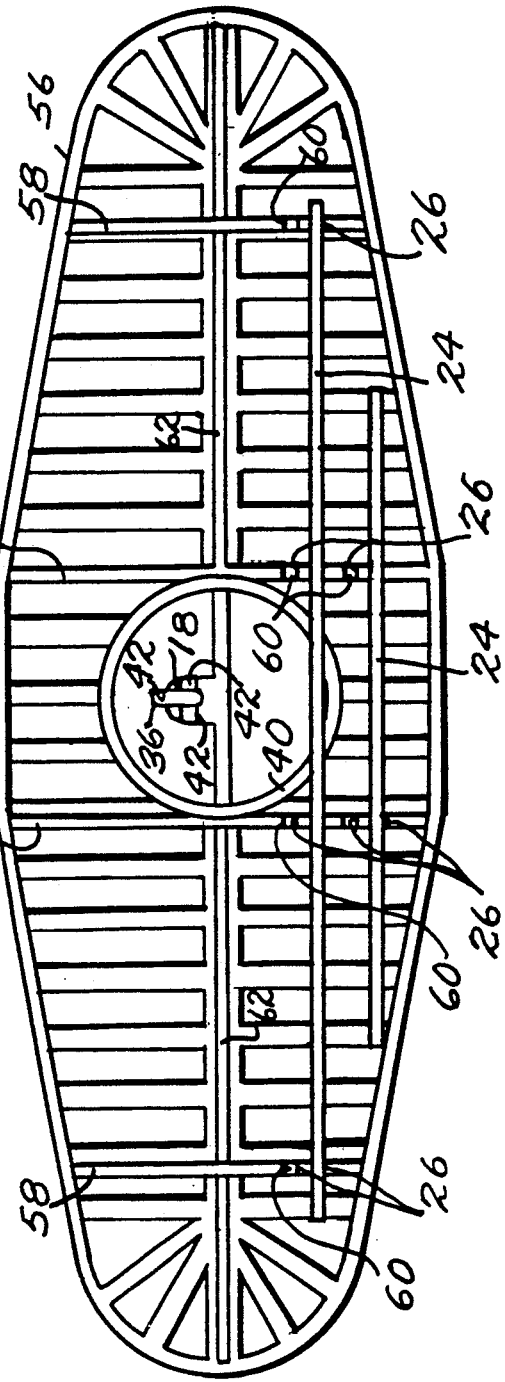

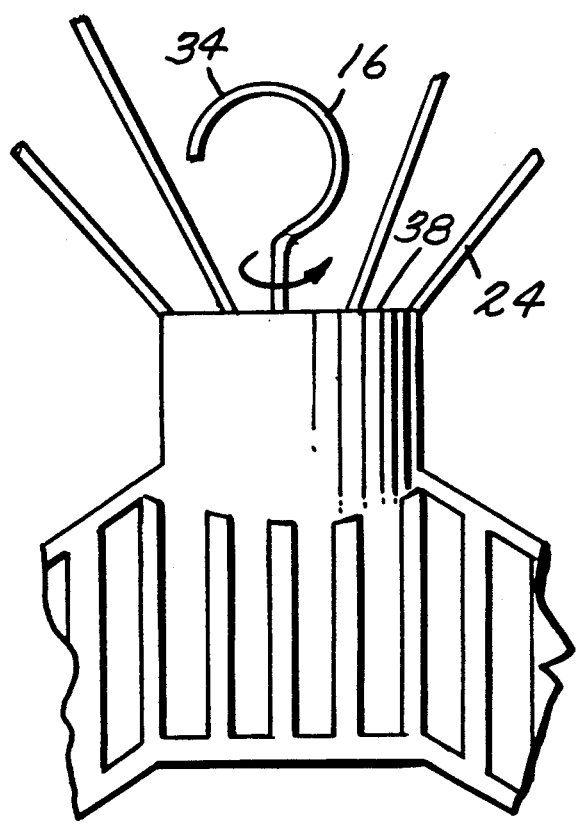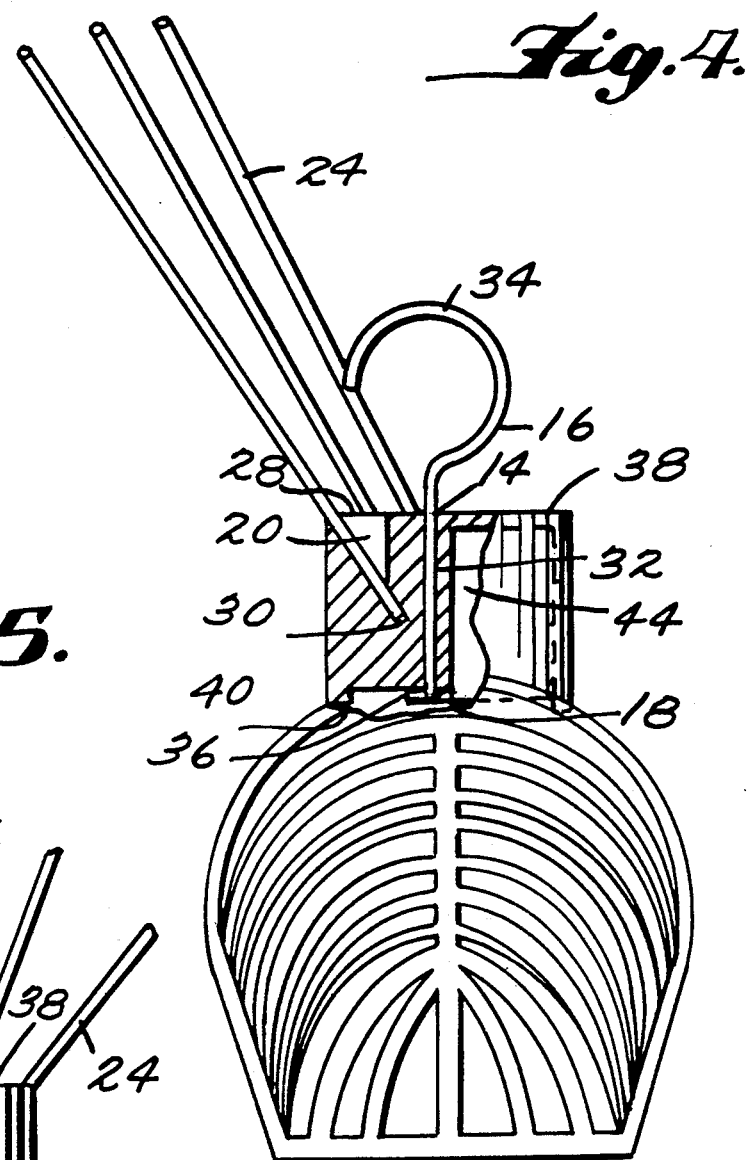

PARTIALLY SEGMENTED DEFORMABLE MIRROR

The United States Government has rights in this invention pursuant to Contract No. W-7405-ENG-48 between the United States Department of Energy and the University of California for operation under Lawrence Livermore National Laboratory.

BACKGROUND OF THE INVENTION

This invention relates to a partially segmented deformable mirror and, more particularly, to such a mirror with improved transducer attachments Segmented deformable mirrors have been used for wave front corrections of a light beam such as a beam from a laser. By a segmented deformable mirror is meant a collection of mutually separated mirror pieces which are so arranged that their front reflective surfaces are substantially coplanar with respect to one another and of which the orientations of the front surfaces can be controllably varied. Since the individual mirror pieces are completely separated, however, it is difficult to control the gaps between mutually adjacent pairs of these mirror pieces and also to prevent adjacent edges from moving apart in the direction normal to the mirror surfaces. Moreover, a portion of the incident beam will fall upon such gaps and be lost by scattering, by diffraction or by absorption. In the first two cases, the intensity profile of the beam is degraded In the third case, the light absorbed in the gaps may damage the mirror if it is used with a high-power beam.

SUMMARY OF THE INVENTION

It is therefore an object of the present invention to provide a deformable mirror with a continuous front surface.

It is another object of the present invention to provide a deformable mirror of which the deformation of the reflective front surface can be easily controlled.

It is still another object of the present invention to provide a deformable mirror having a plurality of deformation-causing transducers attached accurately thereon.

Additional objects, advantages and novel features of the invention will be set forth in part in the description which follows, and in part will become apparent to those skilled in the art upon examination of the following or may be learned by practice of the invention The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the deformable mirror of this invention may comprise a mirror plate having a smooth and continuous front surface and a back surface that is divided into triangular areas by straight grooves, and a plurality of actuator means such as piezoelectric transducers attached to the back surface of the mirror plate for causing displacements of the mirror surface in normal directions. These actuator means are supported by receptacles inserted in the grooves at the positions of the vertices of these triangular areas. The grooves have inner walls which are perpendicular to the mirror surface and the receptacles are formed with outer shells which make planar contacts with the walls, an adhesive being used on these contact surfaces. Adhesives generally contract when they dry but the normal orientations of these contact surfaces and the flexures built into the receptacles serve to minimize the tendency of the mirror to warp.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
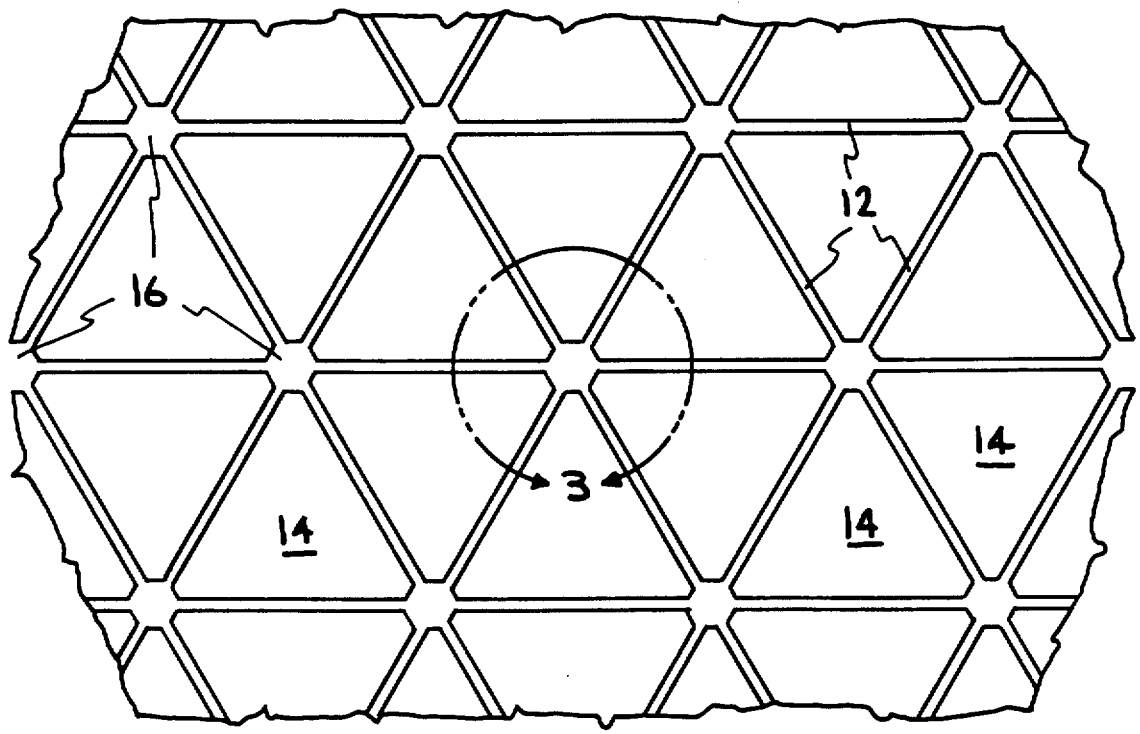
FIG. 1 is a plan view of a portion of the back surface of a mirror plate schematically showing the simplest geometry for a partially segmented deformable mirror embodying the present invention.
Figure 2:
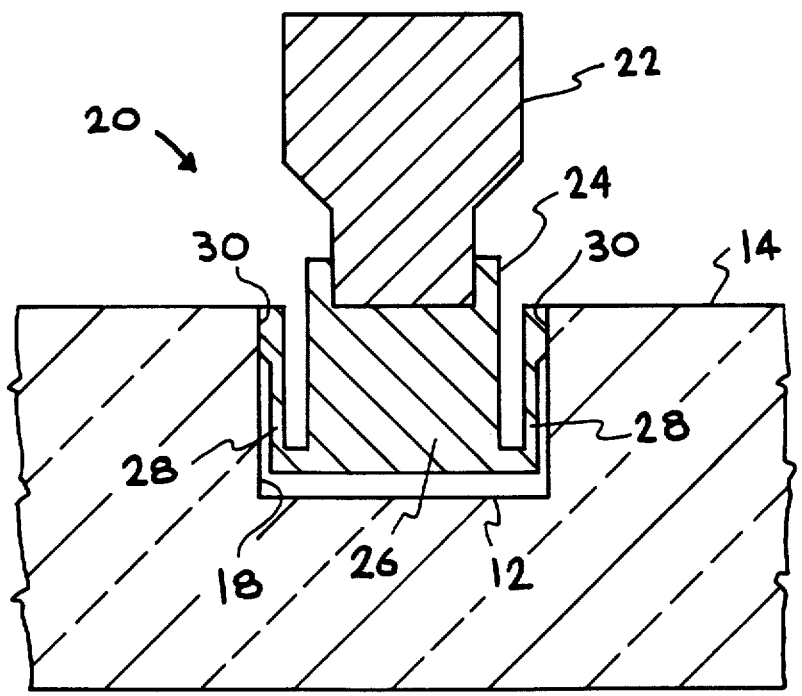
FIG. 2 is a sectional view of a partially segmented deformable mirror of the present invention to show its transducer attachment.

Stated briefly, a partially segmented deformable mirror according to the present invention essentially consists of a planar mirror plate of a dielectric material such as glass and a plurality of actuator means attached to this mirror plate for causing displacements of the mirror surface. The mirror plate has a front surface which is smooth and continuous and a back surface which is parallel to the front surface and is divided into triangular areas mutually separated by grooves. The pattern of these triangular areas may be, for example, as shown in FIG. 1 wherein numerals 12 indicate grooves which are shallow enough not to reach the front surface but deep and wide enough to make the mirror plate deformable within a desired limit. Numerals 14 indicate the triangular areas on the back surface of the mirror plate defined by the grooves 12. Numerals 16 indicate vertices of the triangular areas 14 where different ones of the grooves 12 join. As shown in FIG. 2, the vertices 16 have inner walls 18 which are approximately perpendicular to the surfaces of the mirror plate.

Figure 3:
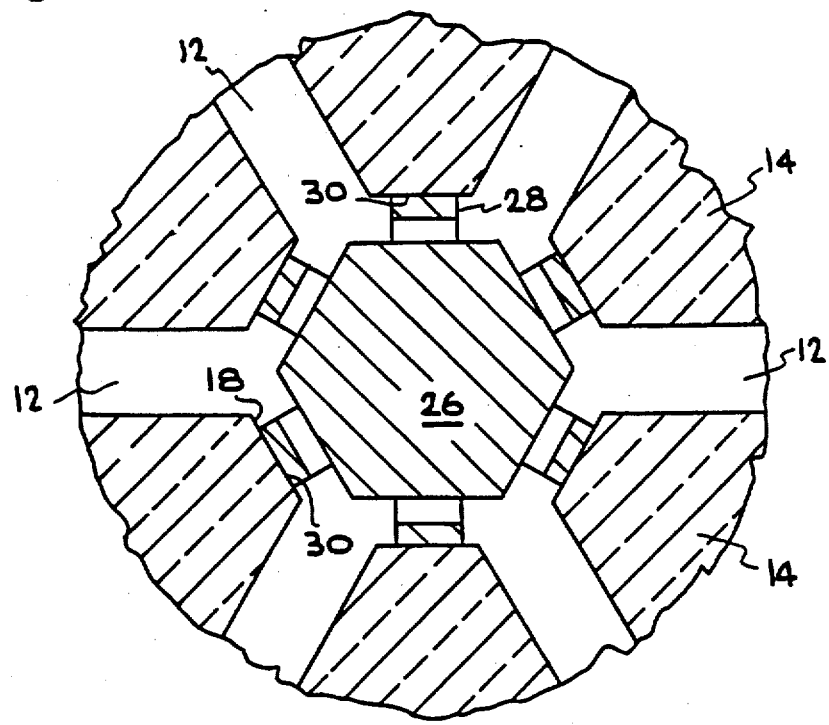
FIG. 3 is a sectional view of the receptacle shown in FIG. 2 with a portion of the mirror plate indicated by the line 3 in FIG. 1.

Actuator means for deforming the mirror plate in a direction normal to its surface are attached to the back surface of the mirror plate at the vertices 16 of the triangular areas 14. As shown in FIG. 2, each actuator means generally indicated at 20 has a piezoelectric transducer 22 firmly attached to and supported by a metallic receptacle 24. The receptacle 24 is inserted into the grooves 12 at one of the vertices 16 and is formed with a main body 26 at the center and a plurality of outer shells 28 as shown both in FIG. 2 and in FIG. 3. The transducer 22 is attached to the main body 26 and the outer shells 28 are unistructurally formed with and attached by a flexure to the main body 26. The outer shells 28 protrude outward from the main body 26 towards the inner walls 18 of the vertex 16 in which the receptacle 24 is inserted. Each outer shell 28 has an outer surface 30 such that, as the receptacle 24 is inserted into the vertex 16, planar contacts are established between these outer surfaces 30 of the outer shells 28 and the inner walls 18 of the vertex 16 as shown in FIGS. 2 and 3. Although not shown in FIG. 2 or FIG. 3, an adhesive such as epoxy is used on these contact surfaces to secure the receptacle 24 against the inner walls 18 of the vertex 16. Although the adhesive tends to contract when it dries, the contact surfaces (outer surfaces 30) are on the outer shells 28 attached to the main body 26 by a flexure. Since the flexure bends easily parallel to the mirror surfaces, the tendency of the contracting adhesive to warp the mirror can be minimized according to the present invention.

Figure 4:
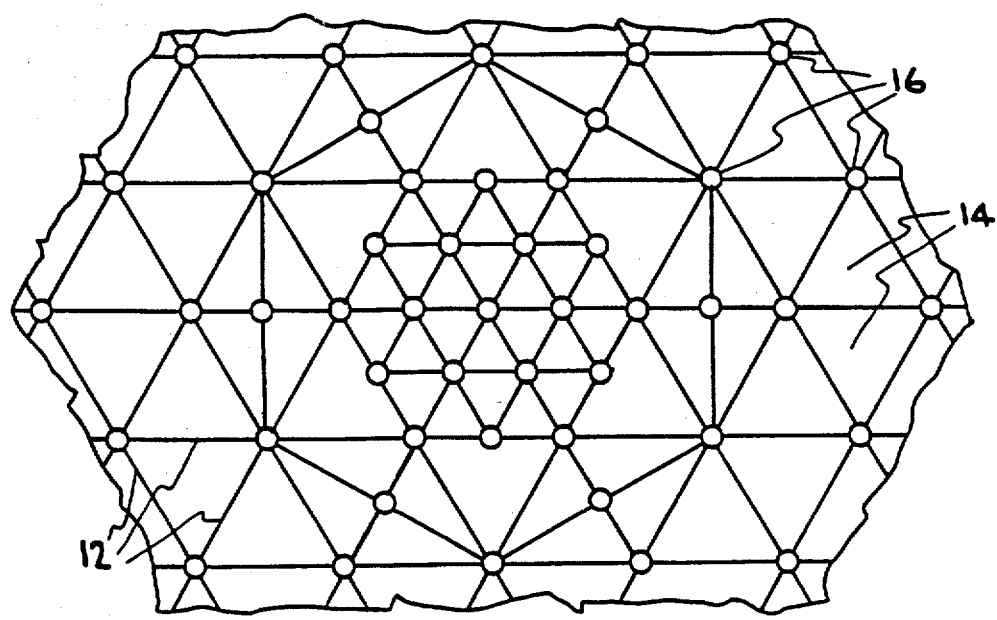
FIG. 4 is a plan view of a portion of the back surface of another mirror plate for a partially segmented deformable mirror embodying the present invention.

The foregoing description of a preferred embodiment of the invention has been presented for purposes of illustration and description. It is not intended to be exhaustive or to limit the invention to the precise form disclosed, and many modifications and variations are possible in light of the above teaching. For example, although FIG. 1 shows a particular arrangement of grooves 12 providing a pattern of triangular areas 14 characterized wherein three sets of mutually parallel and equally separated grooves define triangular areas 14, all of which are equilateral and of the same size, this is by no means to be understood as limiting the scope of the invention. The grooves 12 and the triangular areas 14 may be formed, for example, as shown in FIG. 4, the pattern including vertices where four grooves join, five grooves join, six grooves join and as many as nine grooves join. Although a sectional view of only one receptacle having six outer shells is shown in FIG. 3 as it is inserted into a vertex where six grooves join, a person skilled in the art can easily design receptacles embodying the present invention with different numbers of outer shells and intended to be inserted in a vertex with a different number (from six) of grooves leading therefrom. Although the mirror plate was described as being made of a dielectric material such as glass, a plate of metal or other material may be used to produce a mirror plate. Dielectric materials, however, are more advantageous because commercially available high-power dielectric coating materials perform best when deposited on a dielectric substrate material Any such modifications and variations that may be apparent to a person skilled in the art are intended to be included within the scope of this invention

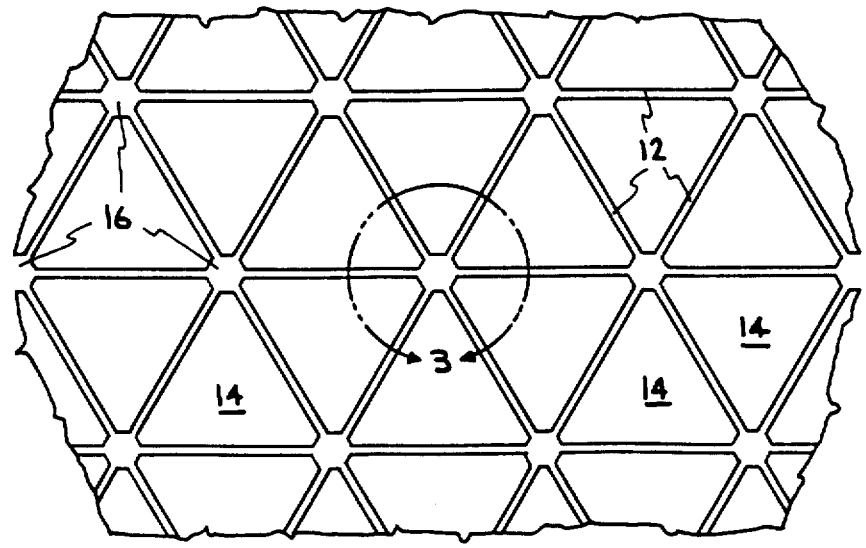

What is claimed is:

1. A partially segmented deformable mirror comprising
    a mirror plate having a smooth and continuous front surface and a back surface which is parallel to said front surface and divided into triangular areas by straight grooves, said triangular areas each defining three vertices and a plurality of said grooves joining at each of said vertices, and
    a plurality of actuator means each attached to said back surface at different one of said vertices for displacing said mirror plate perpendicularly to said front surface.

2. The mirror of claim 1 wherein said triangular areas are equilateral triangles of a predetermined size.

3. The mirror of claim 1 wherein each of said actuator means includes a transducer and a receptacle which is securely connected to said transducer, said vertices having inner walls which are approximately perpendicular to said back surface, said receptacle each having outer surfaces which are perpendicular to said back surface, said receptacle each being inserted in different one of said vertices such that said outer surfaces make planar contacts with said inner walls.

4. The mirror of claim 3 wherein said receptacle comprises a main body and a plurality of outer shells which are attached to said main body by a flexure so as to be able to bend parallel to said back surface, said outer surfaces being on said outer shells.

5. The mirror of claim 3 wherein said outer surfaces and said inner walls are secured to each other by means of an adhesive.

6. The mirror of claim 1 wherein said mirror plate comprises a dielectric material.

7. The mirror of claim 1 wherein said mirror plate comprises glass.

8. The mirror of claim 4 wherein said outer shells are unistructurally formed with said main body.

9. The mirror of claim 3 wherein said receptacles are made of a metallic material.

* * * * *

UNITED STATES PATENT AND TRADEMARK OFFICE
CERTIFICATE OF CORRECTION

PATENT NO. : 5,016,997

DATED : May 21, 1991

INVENTOR(S) : Bliss et al

Page 1 of 4

It is certified that error appears in the above-identified patent and that said Letters Patent is hereby corrected as shown below:

The title page, showing the illustrative figure should be deleted and substitute therefor the attached title page.

In the Drawings

Drawing sheets 1-3, consisting of Figs. 1-5, should be deleted to be replaced with the Drawing sheets, consisting of Figs. 1-4, as shown on the attached page.

Column 1, Line 14, after "attachments" insert --.--

Column 1, Line 30, after "degraded" insert --.--

Column 1, Line 49, after "invention" insert --.--

Column 3, Line 43, after "material" insert --.--

Column 4, Line 2, after "invention" insert --.--

Signed and Sealed this

Nineteenth Day of January, 1993

Attest:

DOUGLAS B. COMER

Attesting Officer

Acting Commissioner of Patents and Trademarks

United States Patent [19]

Bliss et al.

[11] Patent Number: 5,016,997
[45] Date of Patent: May 21, 1991

[54] PARTIALLY SEGMENTED DEFORMABLE MIRROR

[75] Inventors: Erlan S. Bliss, Danville; James R. Smith; J. Thaddeus Salmon, both of Livermore; Julio A. Monjes, San Ramon, all of Calif.

[73] Assignee: The United States of America as represented by the United States Department of Energy, Washington, D.C.

[21] Appl. No.: 523,504

[22] Filed: May 15, 1990

[51] Int. Cl.$^5$ .............................................. G02B 5/08
[52] U.S. Cl. ..................... 350/607; 350/610; 350/611; 372/99
[58] Field of Search ................. 372/99; 350/607, 610, 350/611

[56] References Cited

U.S. PATENT DOCUMENTS 3,904,274  9/1975  Feinleib et al. ................. 350/607
4,657,358  4/1987  Anthony et al. ................ 350/607
4,906,087  3/1990  Ealy et al. ........................ 350/607

*Primary Examiner*—James W. Davie
*Attorney, Agent, or Firm*—Miguel A. Valdes; Roger S. Gaither; William R. Moser

[57] ABSTRACT

A partially segmented deformable mirror is formed with a mirror plate having a smooth and continuous front surface and a plurality of actuators to its back surface. The back surface is divided into triangular areas which are mutually separated by grooves. The grooves are deep enough to make the plate deformable and the actuators for displacing the mirror plate in the direction normal to its surface are inserted in the grooves at the vertices of the triangular areas. Each actuator includes a transducer supported by a receptacle with outer shells having outer surfaces. The vertices have inner walls which are approximately perpendicular to the mirror surface and make planar contacts with the outer surfaces of the outer shells. The adhesive which is used on these contact surfaces tends to contract when it dries but the outer shells can bend and serve to minimize the tendency of the mirror to warp.

9 Claims, 3 Drawing Sheets